United States Patent
Singh et al.

(10) Patent No.: US 10,540,374 B2
(45) Date of Patent: Jan. 21, 2020

(54) DETECTING SOCIAL RELATIONSHIPS FROM USER ACTIVITY LOGS

(71) Applicant: Microsoft Technology Licensing, LLC, Redmond, WA (US)

(72) Inventors: Shiv Nandan Singh, Redmond, WA (US); Jose D. Saura, Kent, WA (US); Gilad Oren, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 361 days.

(21) Appl. No.: 15/145,696

(22) Filed: May 3, 2016

(65) Prior Publication Data
US 2017/0323002 A1 Nov. 9, 2017

(51) Int. Cl.
| | |
|---|---|
| *G06F 17/30* | (2006.01) |
| *G06F 16/28* | (2019.01) |
| *G06Q 50/00* | (2012.01) |
| *G06F 16/2458* | (2019.01) |
| *G06F 16/2455* | (2019.01) |

(52) U.S. Cl.
CPC ........ *G06F 16/285* (2019.01); *G06F 16/2477* (2019.01); *G06F 16/24568* (2019.01); *G06Q 50/01* (2013.01)

(58) Field of Classification Search
CPC ....................................... G06F 17/30
USPC ........................................... 707/740
See application file for complete search history.

(56) References Cited

U.S. PATENT DOCUMENTS

| | | |
|---|---|---|
| 7,664,760 B2 | 2/2010 | Christian et al. |
| 8,327,421 B2 | 12/2012 | Ting |
| 8,401,984 B2 * | 3/2013 | Mahdian ................ G06Q 10/00 706/45 |

(Continued)

FOREIGN PATENT DOCUMENTS

WO    2013039834 A2    3/2013

OTHER PUBLICATIONS

Crane, "Right time, right place: A collaborative approach for more accurate context-awareness in mobile apps and ads", Dec. 1, 2015, pp. 3, Columbia University, retrieved at <<http://www.cs.columbia.edu/2015/collaborative-place-models/>>.

(Continued)

*Primary Examiner* — Kim T Nguyen
(74) *Attorney, Agent, or Firm* — Alleman Hall Creasman & Tuttle LLP

(57) ABSTRACT

Social relationships are detected between a plurality of users. A set of user activity logs is input, where these logs originate from one or more network services and cover a prescribed period of time. Each of the logs originates from a particular one of the services and includes a structured data stream that records each interaction that each of one or more of the users has with the particular one of the services. This structured data stream includes a timestamp specifying when this interaction occurred, and a public network identifier specifying a network address from which this interaction occurred. The set of user activity logs is then analyzed to detect a prescribed kind of social relationship between the users. A data structure is then generated that identifies the users between whom the prescribed kind of social relationship is detected, and the data structure is output.

20 Claims, 5 Drawing Sheets

(56) References Cited

U.S. PATENT DOCUMENTS

| | | | |
|---|---|---|---|
| 8,468,158 B2 | 6/2013 | Kumar et al. | |
| 8,571,999 B2 | 10/2013 | Crawford | |
| 8,615,605 B2 | 12/2013 | Yu et al. | |
| 9,047,245 B2 | 6/2015 | Flinn et al. | |
| 9,049,259 B2* | 6/2015 | Rathod | H04N 21/44222 |
| 9,886,726 B1* | 2/2018 | Gauvin | G06Q 50/01 |
| 10,180,992 B2* | 1/2019 | Cho | G06F 16/2272 |
| 10,366,168 B2* | 7/2019 | Wu | |
| 2011/0276396 A1* | 11/2011 | Rathod | G06Q 10/00 |
| | | | 705/14.49 |
| 2014/0108562 A1 | 4/2014 | Panzer | |
| 2014/0129942 A1* | 5/2014 | Rathod | H04N 21/44222 |
| | | | 715/720 |
| 2014/0337340 A1 | 11/2014 | Yang et al. | |
| 2015/0032535 A1 | 1/2015 | Li et al. | |
| 2015/0120829 A1 | 4/2015 | Johnson et al. | |
| 2015/0134402 A1 | 5/2015 | Barbieri et al. | |
| 2018/0196796 A1* | 7/2018 | Wu | G06F 17/279 |
| 2018/0204111 A1* | 7/2018 | Zadeh | G06N 3/0436 |

OTHER PUBLICATIONS

Kochava, "Kochava Brings Audience Attribution to Mobile Advertising", Jul. 1, 2015, pp. 2, Kochava, retrieved at <<https://www.kochava.com/kochava-brings-audience-attribution-mobile-advertising/>>.

Li, et al., "Multiple Location Profiling for Users and Relationships from Social Network and Content", Proceedings of the Very Large Data Bases (VLDB) Endowment, Aug. 27-31, 2012, pp. 1603-1614, vol. 5, No. 11, VLDB Endowment.

\* cited by examiner

DETECTING SOCIAL RELATIONSHIPS FROM USER ACTIVITY LOGS

BACKGROUND

The Internet is a global data communications system that serves billions of users across the globe and provides them access to a vast array of online information resources and online information services, including those provided by the World Wide Web, intranet-based enterprises, and the like. Internet users spend a large and ever-increasing amount of time online. Thanks to the ubiquity of the Internet and the wide variety of network-enabled end-user computing devices that exist today, it is common for a given user to routinely interact with the Internet's information resources and services on a daily basis, where this interaction commonly occurs from the time the user wakes up until the time they go to sleep, and may also occur from a plurality of different end-user computing devices. The ability to learn about social relationships (e.g., social connections) between Internet users, both in the real world and in cyberspace, is useful in many application contexts. For example, knowing a given user's social relationships can provide insight into the user which can be quite valuable in the context of building social networks, the context of multiplayer gaming, the context of media streaming services, and the context of retail.

SUMMARY

Social relationship detection technique implementations described herein are generally applicable to detecting social relationships between a plurality of users. In one exemplary implementation a set of user activity logs is input, where the set of user activity logs originates from one or more network services and covers a prescribed period of time. Each of the user activity logs originates from a particular one of the network services and includes a structured data stream that records each interaction that each of one or more of the users has with the particular one of the network services, where this structured data stream includes a timestamp specifying when this interaction occurred and a public network identifier specifying a network address from which this interaction occurred. The set of user activity logs is then analyzed to detect a prescribed kind of social relationship between the users. A data structure that identifies the users between whom the prescribed kind of social relationship is detected is then generated, and this data structure is output.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the social relationship detection technique implementations described herein will become better understood with regard to the following description, appended claims, and accompanying drawings where:

DETAILED DESCRIPTION

Figure 1:
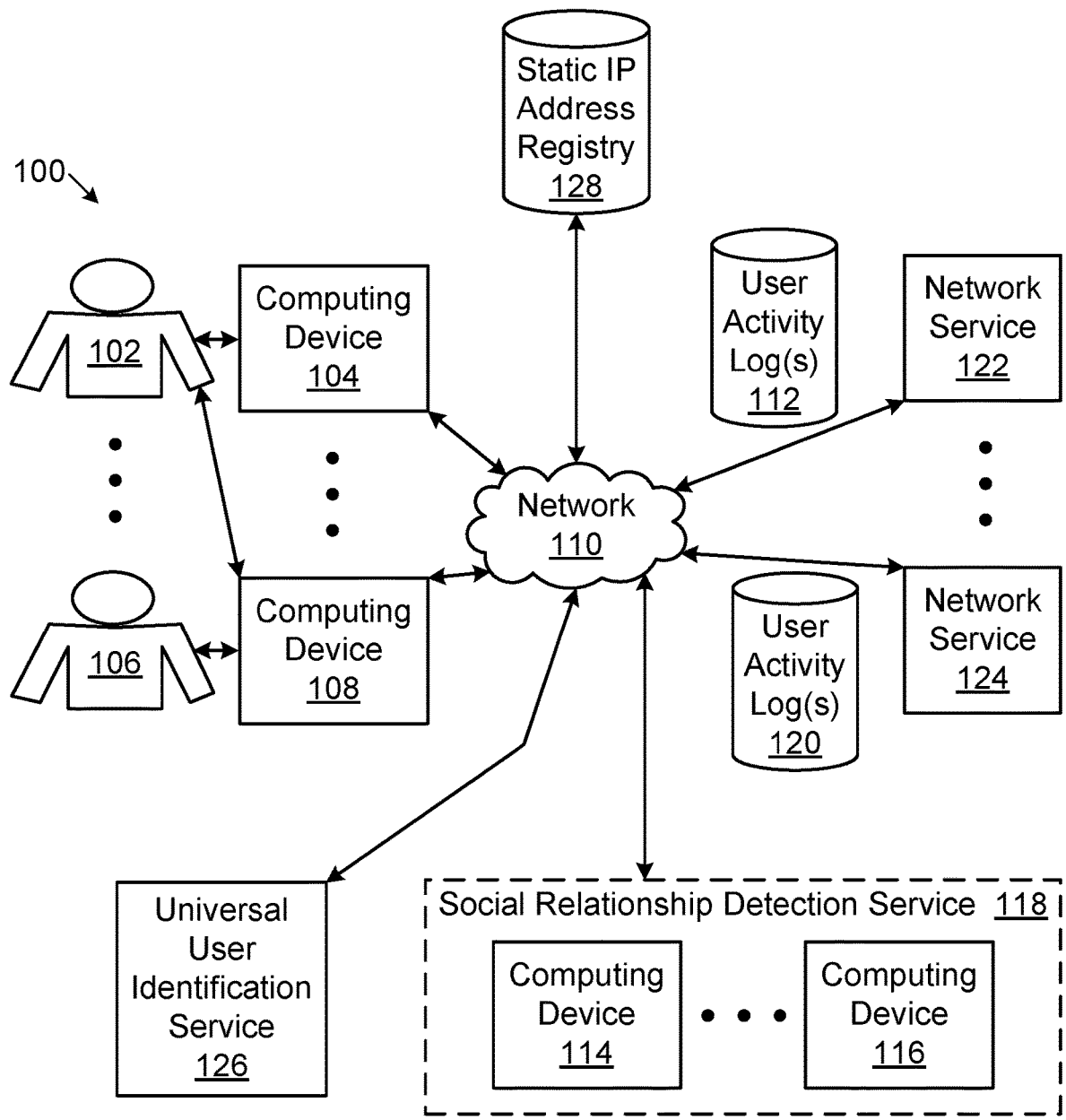
FIG. 1 is a diagram illustrating an exemplary implementation, in simplified form, of a system framework for realizing the social relationship detection technique implementations described herein.

In the following description of social relationship detection technique implementations reference is made to the accompanying drawings which form a part hereof, and in which are shown, by way of illustration, specific implementations in which the social relationship detection technique can be practiced. It is understood that other implementations can be utilized and structural changes can be made without departing from the scope of the social relationship detection technique implementations.

It is also noted that for the sake of clarity specific terminology will be resorted to in describing the social relationship detection technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the social relationship detection technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the social relationship detection technique does not inherently indicate any particular order nor imply any limitations of the social relationship detection technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Detecting Social Relationships from User Activity Logs

The social relationship detection technique implementations described herein generally involve utilizing data in user activity logs from one or more network services to detect social relationships (e.g., social connections) between a plurality of users, and then generating a data structure that describes (e.g., represents) the detected social relationships. In other words and as will be appreciated from the more-detailed description that follows, the social relationship detection technique implementations deduce social relationships between users from user activity log data originating from one or more network services. The term "user" is used herein to refer to an individual who utilizes an end-user computing device to interact with (e.g., access) the online information resources and online information services provided by a data communication network such as the Internet, among other types of data communication networks. The term "end-user computing device" is used herein to refer to a network-enabled individual computing device that is utilized by one or more users to interact with these online information resources and services. The social relationship detection technique implementations are operational with any type of end-user computing device, examples of which are described in more detail hereafter.

The term "network service" is used herein to refer to a given online information service that is provided over a data communication network to one or more end-user computing devices by one or more other computing devices when the end-user computing devices interact with the online information service. As is appreciated in the arts of the Internet and the World Wide Web (hereafter simply referred to as the Web), a vast number of network services exist today and a given end-user computing device commonly interacts with numerous different network services in the course of a given day. For example, various Web search services (also known as Web search engines and Internet search engines) exist that provide end-user computing device users with the ability to search for desired information on the Web. Various weather services exist that provide end-user computing device users with current weather conditions and forecasts. Various email (also known as e-mail and electronic mail) services exist that provide end-user computing device users with the ability to send and receive email. Various authentication services exist that applications running on end-user computing devices can utilize to authenticate the credentials (e.g., the user identifier (ID) (also known as the username and login name, among other things) and password) of their users. Various social networking services exist that provide end-user computing device users with the ability to be part of a social network and maintain social relations (e.g., socially interact) with other users who share similar interests, activities, backgrounds or real-life connections. Various messaging services exist that provide end-user computing device users with the ability to interactively communicate and share information content with other users. The conventional Domain Name System (DNS) is a network service that translates domain names to Internet Protocol (IP) addresses. It is noted that the social relationship detection technique implementations described herein are operational with any type of network service.

As will be described in more detail hereafter, the social relationship detection technique implementations described herein can accurately detect and thus distinguish between many different kinds of social relationships between users including those that are "deeper" (e.g., more complex). By way of example but not limitation, given two different users the social relationship detection technique implementations can accurately detect that the two users are family, or are friends, or are colleagues (e.g., associates, or co-workers, or employees of the same organization, or the like). The social relationship detection technique implementations can also accurately detect a deeper social relationship between the two users such as one of the two users being a head (e.g., a parent) of a household that includes the other of the two users, or one of the two users being a husband of the other of the two users, or one of the two users being a wife of the other of the two users, among other types of deeper social relationships. In a tested implementation of the social relationship detection technique described herein network service user activity logs for a set of 40 million anonymized test users in the United States were successfully analyzed using the social relationship detection technique, and both a family social graph and a colleagues social graph for these test users was generated.

The social relationship detection technique implementations described herein are advantageous for various reasons including, but not limited to, the following. The social relationship detection technique implementations utilize (e.g., rely on) data that is commonly available and pervasive, namely the aforementioned data in user activity logs from one or more network services. The social relationship detection technique implementations also eliminate the false positives and false negatives that can occur when attempting to detect social relationships between a group of users who live in a high-rise apartments building but have no social relationship, or users who live and/or work in a crowded city having a high population density, or users who work for an organization (e.g., a company, or the like) having a plurality of office locations that are geographically distributed in a given city or town.

Additionally and as described heretofore, the ability to learn about social relationships between users, both in the real world and in cyberspace, is useful in many application contexts. As such, and as will be appreciated from the more-detailed description that follows, the social relationship detection technique implementations described herein can be employed in a variety of application contexts. For example, in the context of building social networks the social relationship detection technique implementations can be used to build a social network amongst a group of users, and to provide recommendations to a user of friends, family or colleagues to connect with. In the context of multiplayer gaming the social relationship detection technique implementations can be used to allow a user to play games with other users that the user has a given kind of social relationship with. In the context of media (e.g., music, movies, and the like) streaming services the social relationship detection technique implementations can be used to recommend media to a user based on the media preferences of other users that the user has a given kind of social relationship with. In the context of retail (e.g., organizations who are interested in selling goods (e.g., products) and/or services to users) the social relationship detection technique implementations can be used by a retailer to determine the social relationships between particular users in a group of users with a very high degree of confidence without the retailer having to build or utilize large-scale (and thus expensive) social networks and then relying on the users to willingly input their social relationship data into these social networks. As is appreciated in the art of retail, it can be very valuable for retailers to learn about the social relationships that may exist between the users. For example, it can be very valuable for a given retailer to learn that users A, B and C are related to each other as family, or learn that users A, E and F are friends who often spend evenings together or do activities together, or learn that users B, F and G are colleagues who work for the same organization.

FIG. 1 illustrates an exemplary implementation, in simplified form, of a system framework for realizing the social relationship detection technique implementations described herein. As exemplified in FIG. 1, the system framework 100 includes a plurality of end-user computing devices 104/108 each of which is utilized by one or more users 102/106 to interact with one or more network services 122/124, where this interaction occurs via a conventional data communication network 110 such as the Internet (among other types of conventional networks). In an exemplary implementation of the social relationship detection technique described herein each of the end-user computing devices 104/108 can be any type of conventional mobile computing device such as a smartphone, or a tablet computer, or a laptop computer (sometimes also referred to as a notebook or netbook computer), among other types of conventional mobile computing devices. Each of the end-user computing devices 104/108 can also be any type of conventional non-mobile computing device such as a desktop personal computer (PC), or a video game console, among other types of conventional non-mobile computing devices.

Generally speaking and referring again to FIG. 1, a given user 102/106 may utilize one or more end-user computing devices 104/108 to interact with one or more of the network services 122/124. More particularly, one of the users 106 may utilize just a single end-user computing device 108 to interact with the network services 122/124 over a given period of time, whereas another one of the users 102 may utilize a plurality of end-user computing devices 104/108 to interact with the network services 122/124 over this same period of time. Additionally, two or more users 102/106 may utilize the same end-user computing device 108 to interact with the network services 122/124 over a given period of time. For example, consider the case where user 102 and user 106 are members of the same family and live together in the same home, and user 102 goes to work at an organization that is located remotely from this home. When user 102 is at work they may utilize both a smartphone that they own and a laptop computer that is owned by the organization to interact with the network services 122/124. When user 102 is at home they may utilize both their smartphone and a desktop PC that is located in the home to interact with the network services 122/124, and user 106 may also utilize this desktop PC to interact with the network services 122/124.

Referring again to FIG. 1, in addition to communicating over the data communication network 110 with the network services 122/124, each of the end-user computing devices 104/108 is configured to communicate over the network 110 with a social relationship detection service 118 that operates (e.g., runs) on one or more other computing devices 114/116. These other computing devices 114/116 can also communicate with each other via the network 110. In an exemplary implementation of the social relationship detection technique described herein the other computing devices 114/116 are located in the cloud so that the social relationship detection service 118 operates as a cloud service and the network 110 includes wide area network functionality. The term "cloud service" is used herein to refer to a Web application that operates in the cloud and can be hosted on (e.g., deployed at) a plurality of data centers that can be located in different geographic regions (e.g., different regions of the world). As will be described in more detail hereafter, the social relationship detection service 118 generally analyzes user activity logs 112/120 that originate from the network services 122/124 in order to detect a prescribed kind of social relationship between the users 102/106, and then generates a data structure that describes the detected social relationships. In other words, the social relationship detection technique implementations described herein generally transform data in the user activity logs 112/120 into a data structure that identifies the users 102/106 represented in the logs 112/120 between whom a prescribed kind of social relationship exists. As is appreciated in the art of online information services, the network services 122/124 can provide the user activity logs 112/120 to the social relationship detection service 118 in a variety of ways. For example, one of the network services may provide a single user activity log that includes all of the users that interact with this network service. Another one of the network services may provide a separate user activity log for each of the users that interacts with this network service.

Referring again to FIG. 1, the system framework 100 may also include a universal user identification service 126 that can also be accessed via the data communication network 110. In one implementation of the of the social relationship detection technique described herein whenever there is a plurality of network services 122/124, the universal user identification service 126 provides the network services with a universal user ID (not shown) that uniquely and anonymously identifies each of the users 102/106 across the various network services that they interact with. The universal user ID thus allows each of the users 102/106 to be correlated across the various network services 122/124 that they interact with. The term "anonymously" is used herein to mean that any information about the users 102/106 that is stored in user profiles the users created if they registered on any of the network services 122/124 (e.g., user IDs, user names, user dates of birth, or the like) is not disclosed to the social relationship detection service 118. Whenever a given user (e.g., user 102) utilizes a plurality of end-user computing devices 104/108 to interact with the network services 122/124, the just-described universal user ID is also used to uniquely and anonymously identify the user across each of these end-user computing devices. The universal user ID thus also allows the given user (e.g., user 102) to be correlated across each of the end-user computing devices 104/108 they utilize to interact with the network services 122/124. In summary, the universal user ID can be used to uniquely and anonymously identify a given user across the various network services they interact with and the various end-user computing devices they utilize during these interactions. In another implementation of the social relationship detection technique, rather than the universal user identification service 126 providing the universal ID to the network services 122/124, the social relationship detection service 118 can utilize the universal user identification service 126 to process the user IDs in each of the user activity logs 112/120 and identify when two or more different user IDs correspond to the same user. In other words, the universal user identification service 126 can operate as a user ID correlation service.

Referring again to FIG. 1, the system framework 100 may also include a conventional static IP address registry 128 that can also be accessed via the data communication network 110. Generally speaking and as is appreciated in the art of the Internet, an IP address is a conventional numerical label that is assigned to each of the devices that participates in (e.g., is connected to) a computer network that uses the IP protocol for data communication. The IP address that is assigned to a given device serves various functions including specifying where the device is located on the network. The conventional Internet Assigned Numbers Authority (IANA) manages the global assignment of IP addresses. The IANA has delegated five regional Internet registries (RIRs) to manage the allocation of IP address blocks to Internet service providers and other types of organizations, and to record (e.g., register) these IP address allocations. Each of the five RIRs is responsible for allocating and registering IP addresses in a different region of the world. More particularly, the African Network Information Center (AFRINIC) is responsible for allocating and registering IP addresses in Africa. The American Registry for Internet Numbers (ARIN) is responsible for allocating and registering IP addresses in the United States, Canada, and several other parts of the world. The Asia-Pacific Network Information Centre (APNIC) is responsible for allocating and registering IP addresses in Asia, Australia, New Zealand, and some neighboring countries. The Latin America and Caribbean Network Information Centre (LACNIC) is responsible for allocating and registering IP addresses in Latin America and parts of the Caribbean region. The Réseaux IP Européens Network Coordination Centre (RIPE NCC) is responsible for allocating and registering IP addresses in Europe, Russia, the Middle East, and Central Asia. The static IP address registry 128 shown in FIG. 1 can include any one of these five RIRs, or any combination of these five RIRs.

IP addresses can be generally classified into two types, namely static IP addresses and dynamic IP addresses. An IP address that is newly assigned to a device by a data communication network each time the device connects to the network, among other circumstances, is known as a dynamic IP address. Dynamic IP addresses are thus temporary, and can change over time. An IP address that is permanently assigned to a device and persists on the device regardless of where and when the device is used on the network is known as a static IP address. Organizations may acquire static IP addresses from the just-described five RIRs. For example, a medium-size organization may acquire one or several static IP addresses, and a large organization may acquire a pool of IP addresses. Referring again to FIG. 1, each of the five RIRs provide a lookup service that can be accessed via the data communication network 110, where this lookup service allows an entity to determine the organization that owns a given static IP address.

Figure 2:
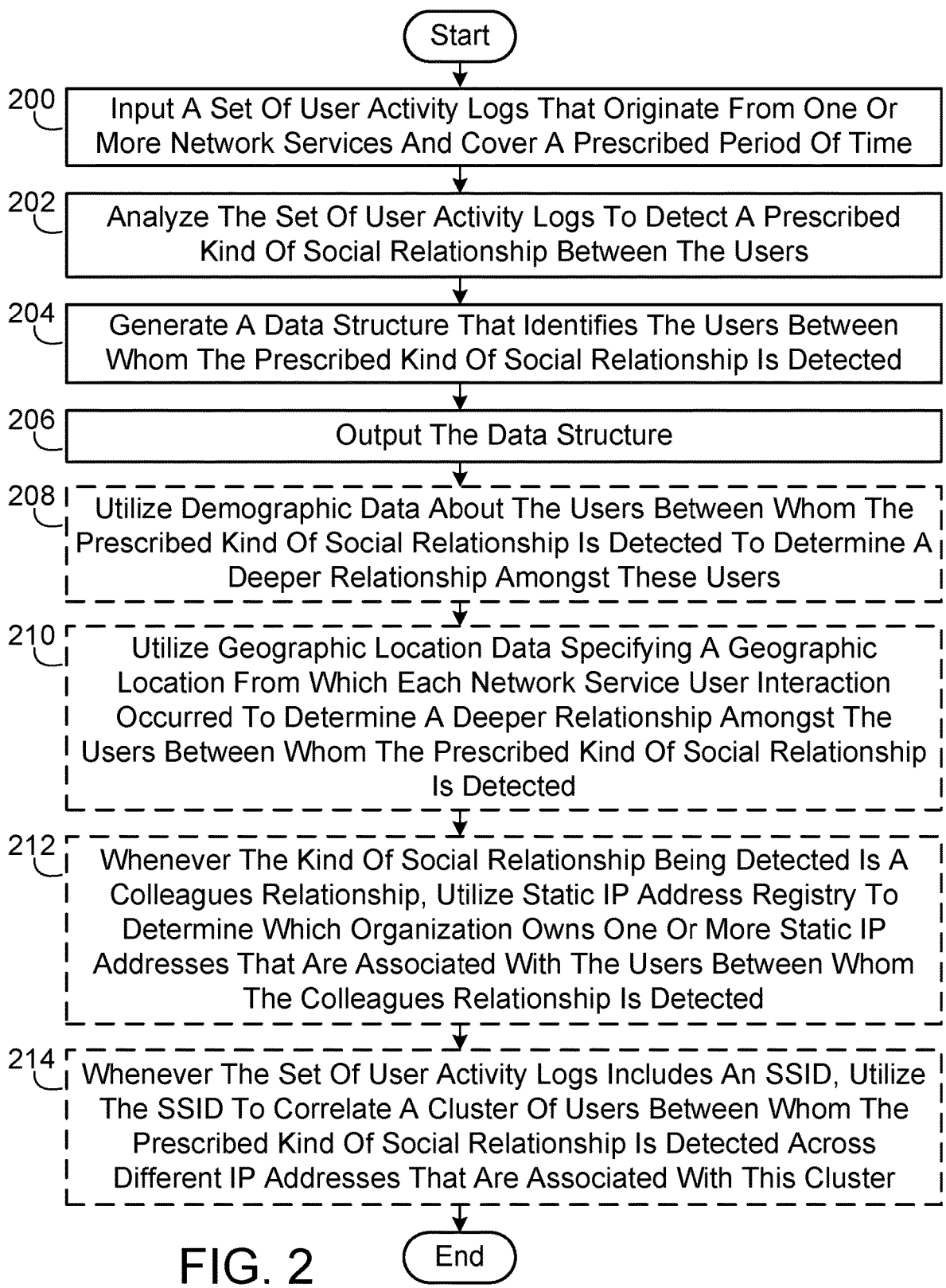
FIG. 2 is a flow diagram illustrating an exemplary implementation, in simplified form, of a process for detecting social relationships between a plurality of users.

FIG. 2 illustrates an exemplary implementation, in simplified form, of a process for detecting social relationships between a plurality of users. In an exemplary implementation of the social relationship detection technique described herein the process illustrated in FIG. 2 is realized on the system framework 100 illustrated in FIG. 1. As exemplified in FIG. 2, the process starts with inputting a set of user activity logs that originate from one or more network services and cover a prescribed period of time (process action 200). In an exemplary implementation of the social relationship detection technique described herein each of the user activity logs originates from a particular one of the network services and includes a structured data stream that records each interaction that each of one or more of the users has with the particular one of the network services. For simplicity sake, each interaction that each of one or more of the users has with the particular one of the network services is hereafter sometimes simply referred to as a network service user interaction. The structured data stream that is associated with a given user activity log can include various types of data. By way of example but not limitation, in one version of the social relationship detection technique this structured data stream includes a timestamp that specifies when each network service user interaction occurred, and a public network ID that specifies a network address from which each network service user interaction occurred.

It will be appreciated that the just-described timestamp can include various types of data. By way of example but not limitation, in a tested implementation of the social relationship detection technique described herein the timestamp includes, but is not limited to, data specifying a calendar date when each network service user interaction occurred, the time zone from which each network service user interaction occurred, and the time of day when each network service user interaction occurred. The just-described public network ID can also include various types of data. By way of example but not limitation, in the tested implementation of the social relationship detection technique the public network ID includes, but is not limited to, data specifying a conventional IP address. In the case where a given network service user interaction occurred via a conventional Wi-Fi local area network (also known as an IEEE (Institute of Electrical and Electronics Engineers) 802.11 wireless local area network), the public network ID may also include a conventional Service Set Identifier (SSID) that identifies (e.g., names) the Wi-Fi local area network.

In one implementation of the of the social relationship detection technique described herein the just-described set of user activity logs originates from a single, large-scale, prevalent network service that is routinely utilized by a large number of users. As is appreciated in the art of online information services, the conventional FACEBOOK® (a registered trademark of Facebook, Inc.) social networking service is one example of such a large-scale, prevalent network service. In another implementation of the social relationship detection technique the set of user activity logs originates from a plurality of network services. In this particular implementation the structured data stream that is associated with each of the user activity logs that originates from a given network service can optionally also include the aforementioned universal user ID that is used to uniquely and anonymously identify each user who initiates an interaction with the network service across each of the network services that this user interacts with. In another implementation of the social relationship detection technique whenever a particular one of the users utilizes a plurality of end-user computing devices to interact with the network services, the structured data stream that is associated with each of the user activity logs that originates from the network services can optionally also include the universal user ID which in this case uniquely and anonymously identifies the particular one of the users across each of the end-user computing devices.

Referring again to FIG. 2, after the set of user activity logs has been input (action 200), the set of user activity logs is analyzed to detect a prescribed kind of social relationship between the users (process action 202). As described heretofore, the social relationship detection technique implementations described herein can accurately detect and thus distinguish between many different kinds of social relationships between the users, examples of which include, but are not limited to, a family relationship, a friends relationship, and a colleagues relationship. The social relationship detection technique implementations can also accurately detect deeper social relationships between a given group of users. By way of example but not limitation, given that the user activity logs analysis of action 202 detects a family relationship between a certain group of users, the social relationship detection technique implementations can detect that a particular one of the users in this group has head-of-household status (e.g., a particular one of the users in the group who is primarily responsible for "running" the household and "caring for" other ones of the users in the group). Exemplary methods for detecting family, friends, colleagues and deeper relationships between the users are described in more detail hereafter. Generally speaking and as will be appreciated from the more-detailed description that follows, increasing the size of the set of user activity logs increases the accuracy of the social relationship detection and thus the confidence in the detected social relationships.

Referring again to FIG. 2, after the user activity logs analysis (action 202) has been completed, a data structure is generated that identifies the users between whom the prescribed kind of social relationship is detected (process action 204), and this data structure is output (process action 206). It will be appreciated that the social relationship detection technique implementations described herein can generate many different types of data structures. By way of example but not limitation, in an exemplary implementation of the social relationship detection technique described herein the data structure that is generated is a social graph. As is appreciated in the art of mathematics, a graph is an abstraction that generally includes nodes and edges, and is used to model relationships between things. Each of the nodes in a given graph represents a different thing. Each of the edges in the graph interconnects a different pair of nodes and indicates a relationship that exists between the two things represented by this pair of nodes. Accordingly, the social graph that is generated by the social relationship detection technique generally includes a plurality of nodes and one or more edges, where each of the nodes in the social graph represents a different one of the users, and each of the edges in the social graph interconnects a different pair of nodes and indicates that the prescribed kind of social relationship is detected between the two users represented by this pair of nodes.

The data structure that identifies the users between whom the prescribed kind of social relationship is detected can be used in a variety of ways. By way of example but not limitation, in one implementation of the social relationship detection technique described herein this data structure can be employed to build a social network that includes the users between whom the prescribed kind of social relationship is detected. In another implementation of the social relationship detection technique the data structure can be employed by a multiplayer gaming service to allow one of the users between whom the prescribed kind of social relationship is detected to play an online multiplayer game with one or more others of said users. In yet another implementation of the social relationship detection technique the data structure can be employed by a media streaming service to recommend media to one of the users between whom the prescribed kind of social relationship is detected based on the media preferences of one or more others of said users. In yet another implementation of the social relationship detection technique the data structure can be employed by a retailer to associate the purchasing habits of one of the users between whom the prescribed kind of social relationship is detected with one or more others of said users.

The following is an exemplary implementation, in simplified form, of a step-by-step method for analyzing the set of user activity logs to detect a family relationship between the users, where the aforementioned prescribed period of time that is covered by the set of user activity logs is a prescribed number N1 of consecutive days. Accordingly and referring again to FIG. 2, the following method corresponds to one version of action 202 where the prescribed kind of social relationship being detected is a family relationship. This method is hereafter simply referred to as the family detection method.

Figure 3:
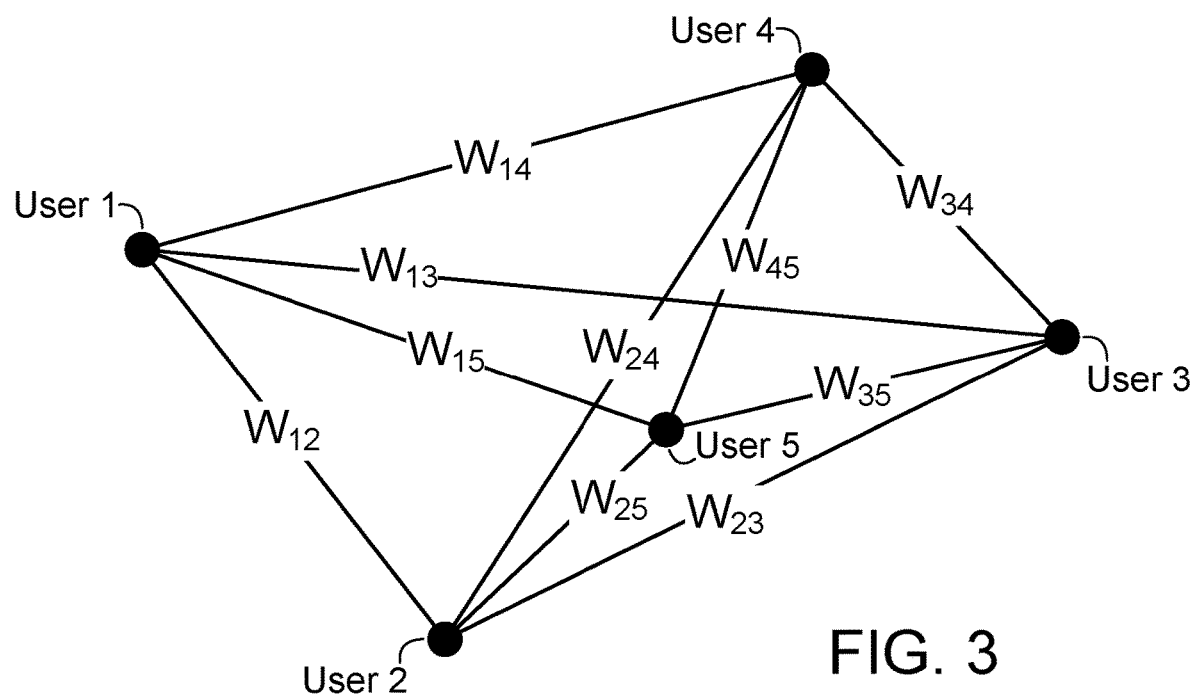
FIG. 3 is a diagram illustrating an exemplary implementation, in simplified form, of a cluster of five different users, where $W_{ij}$ represents the strength of (e.g., the confidence in) the social relationship between each different pair of these users.

1. LOGS=Set of user activity logs for N1 consecutive days. N1 can be any whole number (e.g., integer) that is greater than one. For example, in a tested implementation of the social relationship detection technique described herein N1 was 90.
2. For each of the N1 consecutive days, repeat steps 3 through 13.
3. A=Select all of the user activity logs from LOGS that are associated with the current day.
4. B=Select just those records from A having a timestamp that is within a prescribed evening time frame TF1. TF1 can be any period of time that occurs during a consecutive 24 hour period. For example, in the tested implementation TF1 was between 8:00 PM and 6:00 AM.
5. HOMEIDS=Group all of the records in B by their public network IDs and select all of the public network IDs where there are less than or equal to a prescribed maximum number N2 of different users whose interactions with the network services originated from the same public network ID. This is done because if a given public network ID has more than N2 different users coming from it on any given evening, then the public network ID is not likely to belong to a household. This particular step serves to focus the user activity logs analysis on the public network IDs that are more likely to belong to a household. N2 can be any whole number that is greater than one. For example, in the tested implementation N2 was 20.
6. Each of the public network IDs in HOMEIDS identifies a cluster of users who interacted with the network services using the public network ID. Given that there are N different public network IDs in HOMEIDS, there would be N different clusters of users. Let $C_i$ denote each of these clusters, where $1 \leq i \leq N$.
7. Process each of the clusters $C_i$ one-by-one independently using the following steps 8 through 12.
8. Let K denote the number of different users in the current cluster $C_i$, where $0<K<N2$ because of step 5.
9. Let edge $E_{ij}$ denote the social relationship between a given pair of users (e.g., user i and user j) in a given cluster $C_i$, where edge $E_{ij}$ has a weight $W_{ij}$ that represents the strength of (e.g., the confidence in) the social relationship between the pair of users. FIG. 3 illustrates an exemplary implementation, in simplified form, of a cluster of five different users.
10. For each of the user pairs (user i, user j) in the current cluster $C_i$, repeat step 11.
11. If an edge $E_{ij}$ does not already exist between user i and user j, then set $W_{ij}=1$. If an edge $E_{ij}$ already exists between user i and user j, then increment the existing value of $W_{ij}$ by one (e.g., $W_{ij}=W_{ij}+1$).
12. Are there more clusters to process? If yes, go to back to step 7. If no, go to step 13.
13. At this point a social graph exists for each of the clusters $C_i$ that was generated for the current day, where this graph identifies each of the users in the cluster and includes an edge $E_{ij}$ between each pair of users in the cluster and a corresponding weight $W_{ij}$ representing the strength of the social relationship between this pair of users.
14. After steps 3 through 13 have been completed for each of the N1 consecutive days, X=select all of the edges $E_{ij}$ whose weight $W_{ij}$ is greater than a prescribed social relationship strength threshold T1. T1 can have any value. For example, in the tested implementation T1 was 30.
15. After step 14 has been completed each of the edges $E_{ij}$ in X represents a family relationship between the user i and the user j that are interconnected by the edge.

Given the foregoing, it will be appreciated that the family detection method uses a variety of clustering factors to recursively cluster the users that are represented in the set of user activity logs, where these clustering factors include the prescribed evening time frame TF1, the prescribed maximum number N2 of different users whose interactions with the network services originated from the same public network ID, and the prescribed social relationship strength threshold T1. The family detection method is based on the following intuition. Chances are high that two different users who belong to (e.g., are part of) the same family will interact with the network services from the same public network ID (regardless of whether or not this network ID changes or stays the same from one day to the next) for more than T1 (e.g., 30) evenings during the N1 (e.g., 90) consecutive days.

The following is an exemplary implementation, in simplified form, of a step-by-step method for analyzing the set of user activity logs to detect a friends relationship between the users, where the aforementioned prescribed period of time that is covered by the set of user activity logs is a prescribed number N3 of consecutive days. Accordingly and referring again to FIG. 2, the following method corresponds to another version of action 202 where the prescribed kind of social relationship being detected is a friends relationship. This method is hereafter simply referred to as the friends detection method.

1. LOGS=Set of user activity logs for N3 consecutive days. N3 can be any whole number (e.g., integer) that is greater than one. For example, in a tested implementation of the social relationship detection technique described herein N3 was 90.
2. For each of the N3 consecutive days, repeat steps 3 through 13.
3. A=Select all of the user activity logs from LOGS that are associated with the current day.
4. If the current day is a holiday, then B=Select just those records from A having a timestamp that is within a prescribed holiday time frame TF2. TF2 can be any period of time that occurs during a consecutive 24 hour period. For example, in the tested implementation TF2 was between 10:00 AM and 8:00 PM.
   If the current day is not a holiday, then B=Select just those records from A having a timestamp that is within a prescribed non-holiday time frame TF3. TF3 can be any period of time that occurs during a consecutive 24 hour period. For example, in the tested implementation TF3 was between 5:00 PM and 8:00 PM.
5. USERIDS=Group all of the records in B by their public network IDs and select all of the public network IDs where there are less than or equal to a prescribed maximum number N4 of different users whose interactions with the network services originated from the same public network ID. This is done because if a given public network ID has more than N4 different users coming from it on any given day, then the public network ID is likely to belong to a public place or an organization. This particular step serves to prune/remove the public network IDs that are likely to belong to a public place or an organization. N4 can be any whole number that is greater than one. For example, in the tested implementation N4 was 20.
6. Each of the public network IDs in USERIDS identifies a cluster of users who interacted with the network services using the public network ID. Given that there are N different public network IDs in USERIDS, there would be N different clusters of users. Let $C_i$ denote each of these clusters, where $1 \le i \le N$.
7. Process each of the clusters $C_i$ one-by-one independently using the following steps 8 through 12.
8. Let K denote the number of different users in the current cluster $C_i$, where $0 < K \le N4$ because of step 5.
9. Let edge $E_{ij}$ denote the social relationship between a given pair of users (e.g., user i and user j) in a given cluster $C_i$, where edge $E_{ij}$ has a weight $W_{ij}$ that represents the strength of (e.g., the confidence in) the social relationship between the pair of users.
10. For each of the user pairs (user i, user j) in the current cluster $C_i$, repeat step 11.
11. If an edge $E_{ij}$ does not already exist between user i and user j, then set $W_{ij}=1$. If an edge $E_{ij}$ already exists between user i and user j, then increment the existing value of $W_{ij}$ by one (e.g., $W_{ij}=W_{ij}+1$).
12. Are there more clusters to process? If yes, go to back to step 7. If no, go to step 13
13. At this point a social graph exists for each of the clusters $C_i$ that was generated for the current day, where this graph identifies each of the users in the cluster and includes an edge $E_{ij}$ between each pair of users in the cluster and a corresponding weight $W_{ij}$ representing the strength of the social relationship between this pair of users.
14. After steps 3 through 13 have been completed for each of the N3 consecutive days, X=select all of the edges $E_{ij}$ whose weight $W_{ij}$ is greater than a prescribed social relationship strength threshold T2. T2 can have any value. For example, in the tested implementation T2 was 10.
15. Detect a family relationship between the users in X using the family detection method. Y=remove all of the edges $E_{ij}$ from X that indicate the user i and user j that are interconnected by the edge belong to the same family.
16. After step 15 has been completed each of the edges $E_{ij}$ in Y represents a friends relationship between the user i and the user j that are interconnected by the edge.

Given the foregoing, it will be appreciated that the friends detection method uses a variety of clustering factors to recursively cluster the users that are represented in the set of user activity logs, where these clustering factors include the prescribed holiday time frame TF2, the prescribed non-holiday time frame TF3, the prescribed maximum number N4 of different users whose interactions with the network services originated from the same public network ID, and the prescribed social relationship strength threshold T2. The friends detection method is based on the following intuition. Chances are high that two different users who are friends and do not belong to the same family will hang out together on holidays and evenings and interact with the network services from the same public network ID (regardless of whether or not this network ID changes or stays the same from one day to the next) for more than T2 (e.g., 10) evenings during the N3 (e.g., 90) consecutive days.

The following is an exemplary implementation, in simplified form, of a step-by-step method for analyzing the set of user activity logs to detect a colleagues relationship between the users, where the aforementioned prescribed period of time that is covered by the set of user activity logs is a prescribed number N5 of consecutive days. Accordingly and referring again to FIG. 2, the following method corresponds to another version of action 202 where the prescribed kind of social relationship being detected is a colleagues relationship. This method is hereafter simply referred to as the colleagues detection method.

1. LOGS=Set of user activity logs for N5 consecutive days. N5 can be any whole number (e.g., integer) that is greater than one. For example, in a tested implementation of the social relationship detection technique described herein N5 was 90.
2. For each of the N3 consecutive days, repeat steps 3 through 13.
3. A=Select all of the user activity logs from LOGS that are associated with the current day.
4. If the current day is a holiday, then skip the current day and go back to step 3 for the next day.
   If the current day is not a holiday, then B=Select just those records from A having a timestamp that is within a prescribed non-holiday time frame TF4. TF4 can be any period of time that occurs during a consecutive 24 hour period. For example, in the tested implementation TF4 was between 10:00 AM and 4:00 PM.
5. COMPANYIDS=Group all of the records in B by their public network IDs and select all of the public network IDs where there are greater than a prescribed maximum number N6 of different users whose interactions with the network services originated from the same public network ID. This is done because if a given public network ID has more than N6 different users coming from it on any given day, then the public network ID is likely to belong to a public place or an organization. This particular step serves to prune/remove the public network IDs that are likely to belong to a household or a private area. N6 can be any whole number that is greater than one. For example, in the tested implementation N6 was 50.
6. Each of the public network IDs in COMPANYIDS identifies a cluster of users who interacted with the network services using the public network ID. Given that there are N different public network IDs in COMPANYIDS, there would be N different clusters of users. Let $C_i$ denote each of these clusters, where $1 \leq i \leq N$.
7. Process each of the clusters $C_i$ one-by-one independently using the following steps 8 through 12.
8. Let K denote the number of different users in the current cluster $C_i$, where $K > N6$ because of step 5.
9. Let edge $E_{ij}$ denote the social relationship between a given pair of users (e.g., user i and user j) in a given cluster $C_i$, where edge $E_{ij}$ has a weight $W_{ij}$ that represents the strength of (e.g., the confidence in) the social relationship between the pair of users.
10. For each of the user pairs (user i, user j) in the current cluster $C_i$, repeat step 11.
11. If an edge $E_{ij}$ does not already exist between user i and user j, then set $W_{ij}=1$. If an edge $E_{ij}$ already exists between user i and user j, then increment the existing value of $W_{ij}$ by one (e.g., $W_{ij}=W_{ij}+1$).
12. Are there more clusters to process? If yes, go to back to step 7. If no, go to step 13.
13. At this point a social graph exists for each of the clusters $C_i$ that was generated for the current day, where this graph identifies each of the users in the cluster and includes an edge $E_{ij}$ between each pair of users in the cluster and a corresponding weight $W_{ij}$ representing the strength of the social relationship between this pair of users.
14. After steps 3 through 13 have been completed for each of the N3 consecutive days, X=select all of the edges $E_{ij}$ whose weight $W_{ij}$ is greater than a prescribed social relationship strength threshold T3. T3 can have any value. For example, in the tested implementation T3 was 20.
15. After step 14 has been completed each of the edges $E_{ij}$ in X represents a colleagues relationship between the user i and the user j that are interconnected by the edge.

Given the foregoing, it will be appreciated that the colleagues detection method uses a variety of clustering factors to recursively cluster the users that are represented in the set of user activity logs, where these clustering factors include the prescribed non-holiday time frame TF4, the prescribed maximum number N6 of different users whose interactions with the network services originated from the same public network ID, and the prescribed social relationship strength threshold T3. The colleagues detection method is based on the following intuition. Chances are high that two different users who are colleagues will have a plurality of interactions with the network services from the same public network ID (regardless of whether or not this network ID changes or stays the same from one day to the next) for more than T3 (e.g., 20) working days during the N3 (e.g., 90) consecutive days.

Referring again to FIG. 2, once the prescribed kind of social relationship has been detected between a given plurality of users (action 202), demographic data about this plurality of users can optionally be utilized to determine a deeper relationship amongst this plurality of users (process action 208). By way of example but not limitation, whenever the kind of social relationship being detected is a family relationship, the deeper relationship amongst the users between whom a family relationship is detected can be one of these users being either a head-of-household, or a husband, or a wife. Referring again to FIG. 1, demographic data about the users 102/106 can be obtained in various ways. For example, in one implementation of the of the social relationship detection technique described herein demographic data about the users 102/106 may exist in the user activity logs 112/120 that originate from the network services 122/124. More particularly, when a given user signs up for an account on a given network service, the user may provide certain types of demographic data about themselves (such as their age and gender, among other types of demographic data) during the sign-up process. The network service may then store this demographic data in the user's account and include it in the user activity log(s) it provides to the social relationship detection service 118. In another implementation of the of the social relationship detection technique demographic data about the users 102/106 may be obtained (e.g., purchased) from a third party.

Referring again to FIG. 1, the structured data stream that is associated with each of the user activity logs 112/120 that originates from the network services 122/124 can optionally also include geographic location data specifying a geographic location from which each network service user interaction occurred. Referring again to FIG. 2, once the prescribed kind of social relationship has been detected between a given plurality of users (action 202), this geographic location data can optionally be utilized to determine a deeper relationship amongst this plurality of users (process action 210). By way of example but not limitation, whenever the kind of social relationship being detected is a colleagues relationship and the users between whom a colleagues relationship is detected work for a large company having offices in a plurality of different geographic locations, the just-described geographic location data can be utilized to determine which of these users works at a particular one of the different geographic locations.

Referring again to FIG. 2, whenever the kind of social relationship being detected is a colleagues relationship and the network address that is specified by the public network ID is a static IP address, once a colleagues relationship has been detected between a given plurality of users (action 202), the aforementioned static IP address registry can optionally be utilized to determine which organization owns one or more static IP addresses that are associated with this plurality of users (process action 212). This organization determination is one example of a deeper colleagues relationship. Whenever the network address that is specified by the public network ID is an IP address and the public network ID includes the aforementioned a SSID that identifies a Wi-Fi local area network from which some of the network service user interactions occurred, the SSID can optionally be utilized to correlate a cluster of users between whom the prescribed kind of social relationship is detected across different IP addresses that are associated with this cluster (process action 214). This action 214 increases the accuracy of the social relationship detection in the following situation. Consider the case where a plurality of users who belong to the same family routinely interact with the network services via a home Wi-Fi network that is connected to the network via a conventional router. As is appreciated in the art of the Internet, the public IP address that is assigned to the router may change over time, however, the SSID that is assigned to the home Wi-Fi network will not change over time. In this case the SSID can be utilized to correlate the users who belong to the same family across each of the different IP addresses that are assigned to the router.

Figure 4:
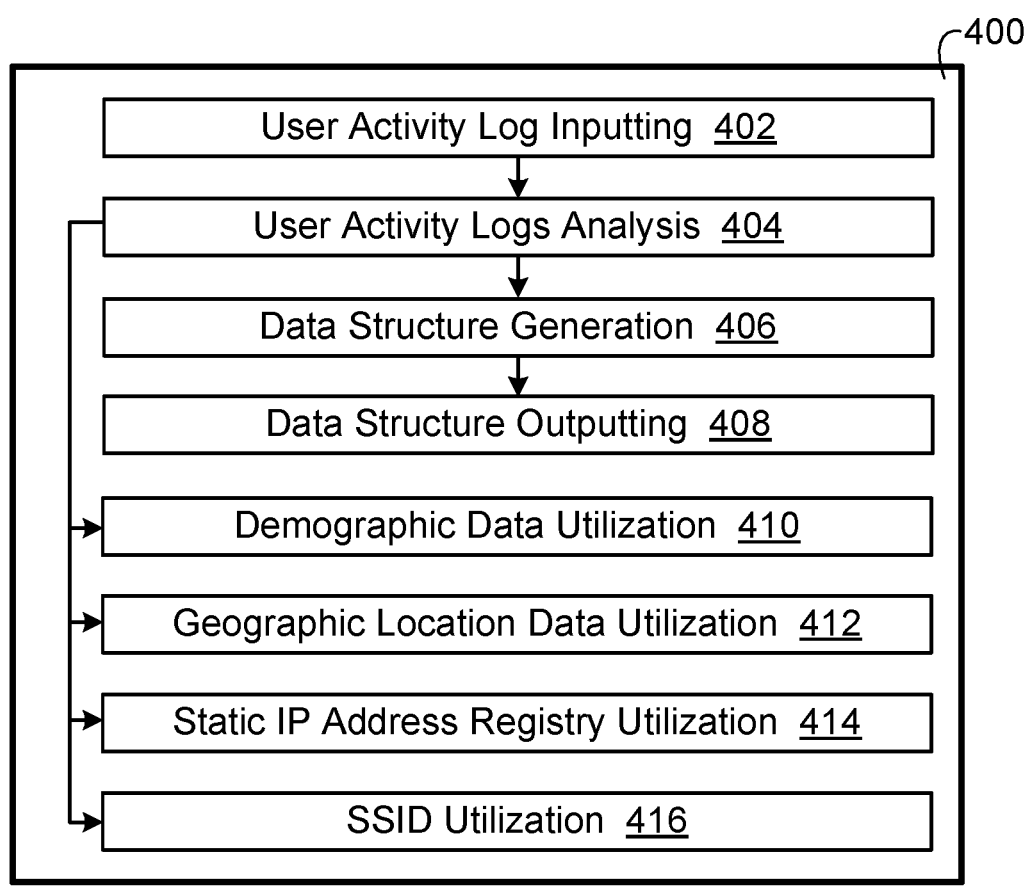
FIG. 4 is a diagram illustrating an exemplary implementation, in simplified form, of a social relationship detector computer program for detecting social relationships between a plurality of users.

FIG. 4 illustrates an exemplary implementation, in simplified form, of a social relationship detector computer program for detecting social relationships between a plurality of users. As exemplified in FIG. 4 and referring again to FIG. 2, the social relationship detector computer program 400 includes, but is not limited to, a user activity logs inputting sub-program 402 that performs action 200, a user activity logs analysis sub-program 404 that performs action 202, a data structure generation sub-program 406 that performs action 204, a data structure outputting sub-program 408 that performs action 206, a demographic data utilization sub-program 410 that performs action 208, a geographic location data utilization sub-program 412 that performs action 210, a static IP address registry utilization sub-program 414 that performs action 212, and an SSID utilization sub-program 416 that performs action 214. Each of the just-described sub-programs is realized on a computing device such as that which is described in more detail in the Exemplary Operating Environments section which follows. More particularly and by way of example but not limitation, and referring again to FIG. 1, in an exemplary implementation of the social relationship detection technique described herein the just-described sub-programs may be realized on the computing devices 114/116.

2.0 Other Implementations

While the social relationship detection technique has been described by specific reference to implementations thereof, it is understood that variations and modifications thereof can be made without departing from the true spirit and scope of the social relationship detection technique. For example, in the situation where the kind of social relationship being detected is a colleagues relationship and the network address that is specified by the public network ID is a dynamic IP address, the following alternate implementation of the social relationship detection technique is possible. Once a colleagues relationship has been detected between a given plurality of users, information may exist in one or more of the user activity logs that identifies the organization from which these users' activity with the network services originated. The dynamic IP address of these particular user activity logs can be correlated over a prescribed correlation period of time with other user activity logs originating from the same dynamic IP address, and it can then be concluded that the user activity in these other user activity logs also originated from the same organization. A value is selected for the correlation period of time where the dynamic IP address does not change during this period of time. For example, in the case where the dynamic IP address changes a plurality of times each day, the correlation period of time may be set to a prescribed number of hours, or minutes, or even seconds.

It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 5:
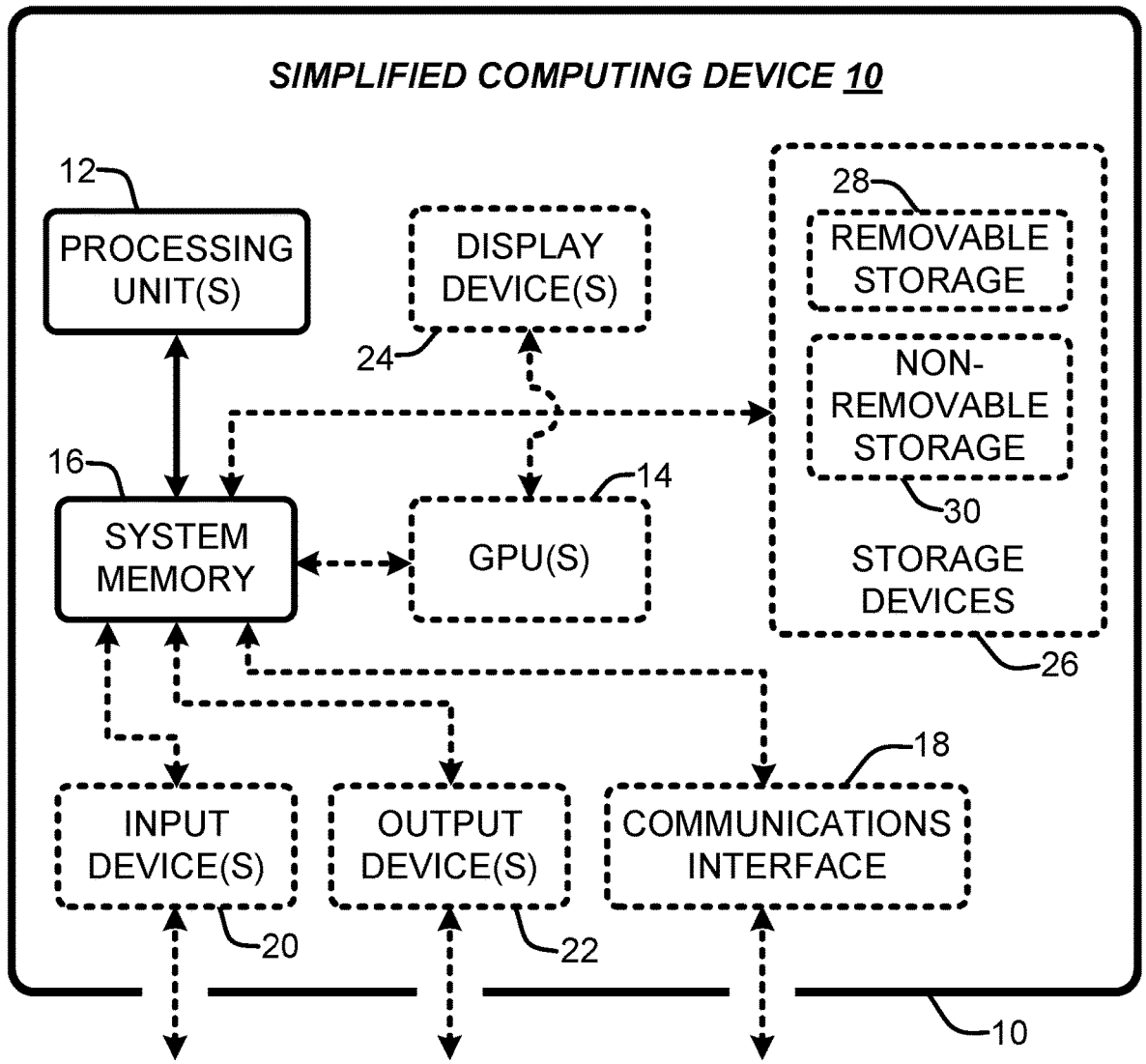
FIG. 5 is a diagram illustrating a simplified example of a general-purpose computer system on which various implementations and elements of the social relationship detection technique, as described herein, may be realized.

The social relationship detection technique implementations described herein are operational within numerous types of general purpose or special purpose computing system environments or configurations. FIG. 5 illustrates a simplified example of a general-purpose computer system on which various implementations and elements of the social relationship detection technique, as described herein, may be implemented. It is noted that any boxes that are represented by broken or dashed lines in the simplified computing device 10 shown in FIG. 5 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the social relationship detection technique implementations described herein, the device should have a sufficient computational capability and system memory to enable basic computational operations. In particular, the computational capability of the simplified computing device 10 shown in FIG. 5 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the social relationship detection technique implementations described herein, including input, output, control, feedback, and response to one or more users or other devices or systems associated with the social relationship detection technique implementations, are enabled by a variety of Natural User Interface (NUI) scenarios. The NUI techniques and scenarios enabled by the social relationship detection technique implementations include, but are not limited to, interface technologies that allow one or more users user to interact with the social relationship detection technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the social relationship detection technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the social relationship detection technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 5 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various social relationship detection technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The social relationship detection technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The social relationship detection technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system is employed for detecting social relationships between a plurality of users. This system includes a social relationship detector that includes one or more computing devices, these computing devices being in communication with each other via a computer network whenever there is a plurality of computing devices, and a computer program having a plurality of sub-programs executable by these computing devices, wherein the sub-programs configure these computing devices to, input a set of user activity logs, the set of user activity logs originating from one or more network services and covering a prescribed period of time, each of the user activity logs originating from a particular one of the network services and including a structured data stream that records each interaction that each of one or more of the users has with the particular one of the network services, this structured data stream including, a timestamp specifying when the interaction occurred, and a public network identifier specifying a network address from which the interaction occurred, analyze the set of user activity logs to detect a prescribed kind of social relationship between the users, generate a data structure that identifies the users between whom the prescribed kind of social relationship is detected, and output the data structure.

In one implementation of the just-described system, the set of user activity logs originates from a single prevalent network service that is routinely utilized by a large number of users. In another implementation the set of user activity logs originates from a plurality of network services, and the structured data stream further includes a universal user identifier that uniquely and anonymously identifies a particular one of the users who initiated the interaction, this universal user identifier being used to uniquely and anonymously identify this particular one of the users across each of the network services that this particular one of the users interacts with. In another implementation, whenever a particular one of the users utilizes a plurality of end-user computing devices to interact with the particular one of the network services, the structured data stream further includes a universal user identifier that uniquely and anonymously identifies the particular one of the users across each of the end-user computing devices.

In another implementation the network address includes an Internet Protocol (IP) address. In one version of this particular implementation the public network identifier includes a Service Set Identifier (SSID) that identifies a Wi-Fi local area network from which the interaction occurred, and the sub-programs of the computer program further configure the computing devices to utilize the SSID to correlate a cluster of users between whom the prescribed kind of social relationship is detected across different IP addresses that are associated with this cluster. In another implementation the sub-programs of the computer program further configure the computing devices to perform one or more of the actions of: employing the data structure to build a social network that includes the users between whom the prescribed kind of social relationship is detected; or employing the data structure to allow one of the users between whom the prescribed kind of social relationship is detected to play a multiplayer game with one or more others of these users; or employing the data structure to recommend media to one of the users between whom the prescribed kind of social relationship is detected based on the media preferences of one or more others of these users; or employing the data structure to associate the purchasing habits of one of the users between whom the prescribed kind of social relationship is detected with one or more others of these users.

In another implementation the prescribed kind of social relationship is a family relationship, the prescribed period of time is a prescribed number N1 of consecutive days, and the sub-program for analyzing the set of user activity logs to detect a prescribed kind of social relationship between the users includes a sub-program for using a variety of clustering factors to recursively cluster the users represented in the set of user activity logs, these clustering factors including a prescribed evening time frame TF1, a prescribed maximum number N2 of different users whose interactions with the network services originated from the same public network identifier, and a prescribed social relationship strength threshold T1. In one version of this particular implementation the prescribed number N1 is 90, the prescribed evening time frame TF1 is between 8:00 PM and 6:00 AM, the prescribed maximum number N2 is 20, and the prescribed social relationship strength threshold T1 is 30.

In another implementation the prescribed kind of social relationship is a friends relationship, the prescribed period of time is a prescribed number N3 of consecutive days, and the sub-program for analyzing the set of user activity logs to detect a prescribed kind of social relationship between the users includes a sub-program for using a variety of clustering factors to recursively cluster the users represented in the set of user activity logs, these clustering factors including a prescribed holiday time frame TF2, a prescribed non-holiday time frame TF3, a prescribed maximum number N4 of different users whose interactions with the network services originated from the same public network identifier, and a prescribed social relationship strength threshold T2. In one version of this particular implementation the prescribed number N3 is 90, the prescribed holiday time frame TF2 is between 10:00 AM and 8:00 PM, the prescribed non-holiday time frame TF3 is between 5:00 PM and 8:00 PM, the prescribed maximum number N4 is 20, and the prescribed social relationship strength threshold T2 is 10.

In another implementation the prescribed kind of social relationship is a colleagues relationship, the prescribed period of time is a prescribed number N5 of consecutive days, and the sub-program for analyzing the set of user activity logs to detect a prescribed kind of social relationship between the users includes a sub-program for using a variety of clustering factors to recursively cluster the users represented in the set of user activity logs, these clustering factors including a prescribed non-holiday time frame TF4, a prescribed maximum number N6 of different users whose interactions with the network services originated from the same public network identifier, and a prescribed social relationship strength threshold T3. In one version of this particular implementation the prescribed number N5 is 90, the prescribed non-holiday time frame TF4 is between 10:00 AM and 4:00 PM, the prescribed maximum number N6 is 50, and the prescribed social relationship strength threshold T3 is 20. In another version the network address includes a static Internet Protocol (IP) address, and the sub-programs of the computer program further configure the computing devices to utilize a static IP address registry to determine which organization owns one or more static IP addresses that are associated with the users between whom the colleagues relationship is detected.

In another implementation the sub-programs of the computer program further configure the computing devices to utilize demographic data about the users between whom the prescribed kind of social relationship is detected to determine a deeper relationship amongst these users. In one version of this particular implementation the prescribed kind of social relationship is a family relationship, the demographic data about the users includes age and gender data, and the deeper relationship is one of the users being one of a head-of-household, or a husband, or a wife. In another implementation the structured data stream further includes geographic location data specifying a geographic location from which the interaction occurred, and the sub-programs of the computer program further configure the computing devices to utilize this geographic location data to determine a deeper relationship amongst the users between whom the prescribed kind of social relationship is detected. In one version of this particular implementation the prescribed kind of social relationship is a colleagues relationship, and the deeper relationship is which of these users works at a particular geographic location.

In another implementation the aforementioned timestamp includes: a calendar date when the interaction occurred; a time zone from which the interaction occurred; and a time of day when the interaction occurred. In another implementation the aforementioned data structure includes a social graph that includes a plurality of nodes and one or more edges, each of the nodes represents a different one of the users, each of the edges interconnects a different pair of nodes and indicates that the prescribed kind of social relationship is detected between the two users represented by this pair of nodes.

The implementations and versions described in any of the previous paragraphs in this section may also be combined with each other, and with one or more of the implementations and versions described prior to this section. For example, some or all of the preceding implementations and versions may be combined with the foregoing implementation where the network address includes an Internet Protocol (IP) address, and where the public network identifier includes a Service Set Identifier (SSID) that identifies a Wi-Fi local area network from which the interaction occurred, and the sub-programs of the computer program further configure the computing devices to utilize the SSID to correlate a cluster of users between whom the prescribed kind of social relationship is detected across different IP addresses that are associated with this cluster. In addition some or all of the preceding implementations and versions may be combined with the foregoing implementation where the prescribed kind of social relationship is a family relationship, the prescribed period of time is a prescribed number $N1$ of consecutive days, and the sub-program for analyzing the set of user activity logs to detect a prescribed kind of social relationship between the users includes a sub-program for using a variety of clustering factors to recursively cluster the users represented in the set of user activity logs, these clustering factors including a prescribed evening time frame $TF1$, a prescribed maximum number $N2$ of different users whose interactions with the network services originated from the same public network identifier, and a prescribed social relationship strength threshold $T1$.

In addition some or all of the preceding implementations and versions may be combined with the foregoing implementation where the prescribed kind of social relationship is a friends relationship, the prescribed period of time is a prescribed number $N3$ of consecutive days, and the sub-program for analyzing the set of user activity logs to detect a prescribed kind of social relationship between the users includes a sub-program for using a variety of clustering factors to recursively cluster the users represented in the set of user activity logs, these clustering factors including a prescribed holiday time frame $TF2$, a prescribed non-holiday time frame $TF3$, a prescribed maximum number $N4$ of different users whose interactions with the network services originated from the same public network identifier, and a prescribed social relationship strength threshold $T2$. In addition some or all of the preceding implementations and versions may be combined with the foregoing implementation where the prescribed kind of social relationship is a colleagues relationship, the prescribed period of time is a prescribed number $N5$ of consecutive days, and the sub-program for analyzing the set of user activity logs to detect a prescribed kind of social relationship between the users includes a sub-program for using a variety of clustering factors to recursively cluster the users represented in the set of user activity logs, these clustering factors including a prescribed non-holiday time frame $TF4$, a prescribed maximum number $N6$ of different users whose interactions with the network services originated from the same public network identifier, and a prescribed social relationship strength threshold $T3$.

In another implementation, a computer-implemented process is employed for detecting social relationships between a plurality of users, the process including the actions of: using one or more computing devices to perform the following process actions, the computing devices being in communication with each other via a computer network whenever a plurality of computing devices is used: inputting a set of user activity logs, the set of user activity logs originating from one or more network services and covering a prescribed period of time, each of the user activity logs originating from a particular one of the network services and including a structured data stream that records each interaction that each of one or more of the users has with the particular one of the network services, this structured data stream including, a timestamp specifying when the interaction occurred, and a public network identifier specifying a network address from which the interaction occurred, analyzing the set of user activity logs to detect a prescribed kind of social relationship between the users, generating a data structure that identifies the users between whom the prescribed kind of social relationship is detected, and outputting the data structure.

In another implementation a computer-readable storage medium has computer-executable instructions stored thereon that, responsive to execution by a computing device, cause the computing device to detect social relationships between a plurality of users, this detection including: inputting a set of user activity logs, the set of user activity logs originating from one or more network services and covering a prescribed period of time, each of the user activity logs originating from a particular one of the network services and including a structured data stream that records each interaction that each of one or more of the users has with the particular one of the network services, this structured data stream including, a timestamp specifying when the interaction occurred, and a public network identifier specifying a network address from which the interaction occurred, analyzing the set of user activity logs to detect a prescribed kind of social relationship between the users, generating a data structure that identifies the users between whom the prescribed kind of social relationship is detected, and outputting the data structure.

In another implementation a social relationship detection system is implemented by a means for detecting social relationships between a plurality of users. The social relationship detection system includes a social relationship detector that includes one or more computing devices. These computing devices are in communication with each other via a computer network whenever there is a plurality of computing devices. These computing devices include processors configured to execute: an inputting step for inputting a set of user activity logs, the set of user activity logs originating from one or more network services and covering a prescribed period of time, each of the user activity logs originating from a particular one of the network services and including a structured data stream that records each interaction that each of one or more of the users has with the particular one of the network services, this structured data stream including, a timestamp specifying when the interaction occurred, and a public network identifier specifying a network address from which the interaction occurred; an analysis step for analyzing the set of user activity logs to detect a prescribed kind of social relationship between the users; a generation step for generating a data structure that identifies the users between whom the prescribed kind of social relationship is detected; and an outputting step for outputting the data structure.

In one version of the just-described social relationship detection system the network address includes an Internet Protocol (IP) address, the public network identifier includes a Service Set Identifier (SSID) that identifies a Wi-Fi local area network from which the interaction occurred, and the processors are further configured to execute a correlation step for utilizing the SSID to correlate a cluster of users between whom the prescribed kind of social relationship is detected across different IP addresses that are associated with this cluster. In another version of this system the processors are further configured to execute one or more of: a social network building step for employing the data structure to build a social network that includes the users between whom the prescribed kind of social relationship is detected; or a multiplayer gaming step for employing the data structure to allow one of the users between whom the prescribed kind of social relationship is detected to play a multiplayer game with one or more others of these users; or a media recommendation step for employing the data structure to recommend media to one of the users between whom the prescribed kind of social relationship is detected based on the media preferences of one or more others of these users; or a purchasing habits association step for employing the data structure to associate the purchasing habits of one of the users between whom the prescribed kind of social relationship is detected with one or more others of these users.

In another version of the social relationship detection system the prescribed kind of social relationship is a family relationship, the prescribed period of time is a prescribed number N1 of consecutive days, and the analysis step for analyzing the set of user activity logs to detect a prescribed kind of social relationship between the users includes a first recursive clustering step for using a variety of clustering factors to recursively cluster the users represented in the set of user activity logs, these clustering factors including a prescribed evening time frame TF1, a prescribed maximum number N2 of different users whose interactions with the network services originated from the same public network identifier, and a prescribed social relationship strength threshold T1. In another version of this system the prescribed kind of social relationship is a friends relationship, the prescribed period of time is a prescribed number N3 of consecutive days, and the analysis step for analyzing the set of user activity logs to detect a prescribed kind of social relationship between the users includes a second recursive clustering step for using a variety of clustering factors to recursively cluster the users represented in the set of user activity logs, these clustering factors including a prescribed holiday time frame TF2, a prescribed non-holiday time frame TF3, a prescribed maximum number N4 of different users whose interactions with the network services originated from the same public network identifier, and a prescribed social relationship strength threshold T2.

In another version of the social relationship detection system the prescribed kind of social relationship is a colleagues relationship, the prescribed period of time is a prescribed number N5 of consecutive days, and the analysis step for analyzing the set of user activity logs to detect a prescribed kind of social relationship between the users includes a third recursive clustering step for using a variety of clustering factors to recursively cluster the users represented in the set of user activity logs, these clustering factors including a prescribed non-holiday time frame TF4, a prescribed maximum number N6 of different users whose interactions with the network services originated from the same public network identifier, and a prescribed social relationship strength threshold T3. In one realization of the just-described version of the social relationship detection system the network address includes a static Internet Protocol (IP) address, and the processors are further configured to execute an organization determination step for utilizing a static IP address registry to determine which organization owns one or more static IP addresses that are associated with the users between whom the colleagues relationship is detected.

In another version of the social relationship detection system the processors are further configured to execute a first deeper relationship determination step for utilizing demographic data about the users between whom the prescribed kind of social relationship is detected to determine a deeper relationship amongst these users. In another version of this system the structured data stream further includes geographic location data specifying a geographic location from which the interaction occurred, and the processors are further configured to execute a second deeper relationship determination step for utilizing this geographic location data to determine a deeper relationship amongst the users between whom the prescribed kind of social relationship is detected.

Wherefore, what is claimed is:

1. A system for detecting social relationships between a plurality of users, comprising:
   a social relationship detector comprising one or more computing devices, said computing devices being in communication with each other via a computer network whenever there is a plurality of computing devices, and a computer program having a plurality of sub-programs executable by said computing devices, wherein the sub-programs configure said computing devices to:
   input a set of user activity logs, the set of user activity logs originating from one or more network services, each of the user activity logs originating from a particular one of the network services and comprising a structured data stream that records each interaction that each of the plurality of users has with the particular one of the network services, said structured data stream comprising,
      a timestamp specifying when said interaction occurred, and
      a public network identifier specifying a network address from which said interaction by a respective user of the plurality of users occurred at the timestamp at a client end of a communications network with respect to the particular one of the network services at a service end of the communications network,
   analyze the set of user activity logs to detect a prescribed kind of social relationship between the users by correlating a cluster of two or more of the users interacting with the one or more network services over a same period of time based on the public network identifier and the timestamp of respective interactions specified by the set of user activity logs,
   generate a data structure that identifies the users between whom the prescribed kind of social relationship is detected, and
   output the data structure.

2. The system of claim 1, wherein the set of user activity logs originates from a single prevalent network service that is routinely utilized by a large number of users.

3. The system of claim 1, wherein the set of user activity logs originates from a plurality of network services, and said structured data stream further comprises a universal user identifier that uniquely and anonymously identifies a particular one of the users who initiated said interaction, said universal user identifier being used to uniquely and anonymously identify said particular one of the users across each of the network services that said particular one of the users interacts with.

4. The system of claim 1, wherein whenever a particular one of the users utilizes a plurality of end-user computing devices to interact with the particular one of the network services, said structured data stream further comprises a universal user identifier that uniquely and anonymously identifies the particular one of the users across each of the end-user computing devices.

5. The system of claim 1, wherein the network address comprises an Internet Protocol (IP) address.

6. The system of claim 5, wherein the public network identifier comprises a Service Set Identifier (SSID) that identifies a Wi-Fi local area network from which said interaction occurred, and the sub-programs of the computer program further configure said computing devices to utilize the SSID to correlate the cluster of users between whom the prescribed kind of social relationship is detected across different IP addresses that are associated with said cluster.

7. The system of claim 1, wherein the sub-programs of the computer program further configure said computing devices to perform one or more of:
employing the data structure to build a social network that includes the users between whom the prescribed kind of social relationship is detected; or
employing the data structure to allow one of the users between whom the prescribed kind of social relationship is detected to play a multiplayer game with one or more others of said users; or
employing the data structure to recommend media to one of the users between whom the prescribed kind of social relationship is detected based on media preferences of one or more others of said users; or
employing the data structure to associate purchasing habits of one of the users between whom the prescribed kind of social relationship is detected with one or more others of said users.

8. The system of claim 1, wherein the prescribed kind of social relationship comprises a family relationship, the same period of time comprises a prescribed number N1 of consecutive days, and the sub-program for analyzing the set of user activity logs to detect the prescribed kind of social relationship between the users comprises a sub-program for using a variety of clustering factors to recursively cluster the users represented in the set of user activity logs, said clustering factors comprising a prescribed evening time frame TF1, a prescribed maximum number N2 of different users whose interactions with the network services originated from a same public network identifier, and a prescribed social relationship strength threshold T1.

9. The system of claim 8, wherein the prescribed number N1 is 90, the prescribed evening time frame TF1 is between 8:00 PM and 6:00 AM, the prescribed maximum number N2 is 20, and the prescribed social relationship strength threshold T1 is 30.

10. The system of claim 1, wherein the prescribed kind of social relationship comprises a friends relationship, the same period of time comprises a prescribed number N3 of consecutive days, and the sub-program for analyzing the set of user activity logs to detect the prescribed kind of social relationship between the users comprises a sub-program for using a variety of clustering factors to recursively cluster the users represented in the set of user activity logs, said clustering factors comprising a prescribed holiday time frame TF2, a prescribed non-holiday time frame TF3, a prescribed maximum number N4 of different users whose interactions with the network services originated from a same public network identifier, and a prescribed social relationship strength threshold T2.

11. The system of claim 10, wherein the prescribed number N3 is 90, the prescribed holiday time frame TF2 is between 10:00 AM and 8:00 PM, the prescribed non-holiday time frame TF3 is between 5:00 PM and 8:00 PM, the prescribed maximum number N4 is 20, and the prescribed social relationship strength threshold T2 is 10.

12. The system of claim 1, wherein the prescribed kind of social relationship comprises a colleagues relationship, the same period of time comprises a prescribed number N5 of consecutive days, and the sub-program for analyzing the set of user activity logs to detect the prescribed kind of social relationship between the users comprises a sub-program for using a variety of clustering factors to recursively cluster the users represented in the set of user activity logs, said clustering factors comprising a prescribed non-holiday time frame TF4, a prescribed maximum number N6 of different users whose interactions with the network services originated from a same public network identifier, and a prescribed social relationship strength threshold T3.

13. The system of claim 12, wherein the prescribed number N5 s 90, the prescribed non-holiday time frame TF4 is between 10:00 AM and 4:00 PM, the prescribed maximum number N6 is 50, and the prescribed social relationship strength threshold T3 is 20.

14. The system of claim 12, wherein the network address comprises a static Internet Protocol (IP) address, and the sub-programs of the computer program further configure said computing devices to utilize a static IP address registry to determine which organization owns one or more static IP addresses that are associated with the users between whom the colleagues relationship is detected.

15. The system of claim 1, wherein the sub-programs of the computer program further configure said computing devices to utilize demographic data about the users between whom the prescribed kind of social relationship is detected to determine a deeper relationship amongst said users.

16. The system of claim 15, wherein the prescribed kind of social relationship comprises a family relationship, the demographic data about the users comprises age and gender data, and the deeper relationship comprises one of said users being one of a head-of-household, or a husband, or a wife.

17. The system of claim 1, wherein said structured data stream further comprises geographic location data specifying a geographic location from which said interaction occurred, and the sub-programs of the computer program further configure said computing devices to utilize said geographic location data to determine a deeper relationship amongst the users between whom the prescribed kind of social relationship is detected.

18. The system of claim 17, wherein the prescribed kind of social relationship comprises a colleagues relationship, and the deeper relationship comprises which of said users works at a particular geographic location.

19. A computer-implemented process for detecting social relationships between a plurality of users, the process comprising:
using one or more computing devices to perform the following process actions, the computing devices being in communication with each other via a computer network whenever a plurality of computing devices is used:
inputting a set of user activity logs, the set of user activity logs originating from one or more network services, each of the user activity logs originating from a particular one of the network services and comprising a structured data stream that records each interaction that each of the plurality of users has with the particular one of the network services, said structured data stream comprising,
a timestamp specifying when said interaction occurred, and
a public network identifier specifying a network address from which said interaction by a respective user of the plurality of users occurred at the timestamp at a client end of a communications network with respect to the particular one of the network services at a service end of the communications network,
analyzing the set of user activity logs to detect a prescribed kind of social relationship between the users by correlating a cluster of two or more of the users interacting with the one or more network services over a same period of time based on the public network identifier and the timestamp of respective interactions specified by the set of user activity logs,
generating a data structure that identifies the users between whom the prescribed kind of social relationship is detected, and
outputting the data structure.

20. A computer-readable storage medium having computer-executable instructions stored thereon that, responsive to execution by a computing device, cause the computing device to detect social relationships between a plurality of users, said detection comprising:
inputting a set of user activity logs, the set of user activity logs originating from one or more network services, each of the user activity logs originating from a particular one of the network services and comprising a structured data stream that records each interaction that each of the plurality of users has with the particular one of the network services, said structured data stream comprising,
a timestamp specifying when said interaction occurred, and
a public network identifier specifying a network address from which said interaction by a respective user of the plurality of users occurred at the timestamp at a client end of a communications network with respect to the particular one of the network services at a service end of the communications network,
analyzing the set of user activity logs to detect a prescribed kind of social relationship between the users by correlating a cluster of two or more of the users interacting with the one or more network services over a same period of time based on the public network identifier and the timestamp of respective interactions specified by the set of user activity logs,
generating a data structure that identifies the users between whom the prescribed kind of social relationship is detected, and
outputting the data structure.

* * * * *